United States Patent
Chen

(10) Patent No.: US 10,899,964 B2
(45) Date of Patent: Jan. 26, 2021

(54) PEROVSKITE QUANTUM DOT PREPARATION METHOD AND PEROVSKITE QUANTUM DOT SOLUTION

(71) Applicant: Wuhan China Star Optoelectronics Semiconductor Display Technology Co., Ltd., Hubei (CN)

(72) Inventor: Xu Chen, Guangdong (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 137 days.

(21) Appl. No.: 16/120,440

(22) Filed: Sep. 3, 2018

(65) Prior Publication Data
US 2019/0345382 A1     Nov. 14, 2019

Related U.S. Application Data

(63) Continuation of application No. PCT/CN2018/096195, filed on Jul. 19, 2018.

(30) Foreign Application Priority Data

May 14, 2018 (CN) .......................... 2018 1 0457127

(51) Int. Cl.
    *C09K 11/66*     (2006.01)
    *C01G 21/16*     (2006.01)
    (Continued)

(52) U.S. Cl.
    CPC ............ *C09K 11/665* (2013.01); *C01G 21/16* (2013.01); *B82Y 20/00* (2013.01); *B82Y 40/00* (2013.01);
(Continued)

(58) Field of Classification Search
CPC ..... C01G 21/006; C01G 21/16; C09K 11/665
See application file for complete search history.

(56) References Cited

U.S. PATENT DOCUMENTS

2017/0327738 A1* 11/2017 Chien .................. C09K 11/665
2018/0312754 A1    11/2018 Pan et al.

FOREIGN PATENT DOCUMENTS

CN     105331362 A     2/2016
CN     105441074 A     3/2016
(Continued)

OTHER PUBLICATIONS

Hua Wu et al., "Surface ligand modification of cesium lead bromide nanocrystals for improved light-emitting performance", Nanoscale, Jan. 25, 2018, 10, pp. 4173-4178, taken from https://pubs.rsc.org/en/content/articlepdf/2018/nr/c7nr09126e (Year: 2018).*

*Primary Examiner* — Ngoc-Yen Nguyen

(57) ABSTRACT

A perovskite quantum dot preparation method and a perovskite quantum dot solution are provided. The preparation method may include: providing a first solution including caesium oleate, a second solution including lead halide and a third solution including DDAB; adding the first solution, the second solution and the third solution into a non-polar alkyl solution at a preset proportion and stirring to obtain a perovskite quantum dot solution; the perovskite quantum dot solution may include caesium-lead-halogen of pure phase. In this way, the present disclosure can easily obtain the perovskite quantum dot solution including caesium-lead-halogen of pure phase.

11 Claims, 3 Drawing Sheets

(51) Int. Cl.
    *B82Y 20/00* (2011.01)
    *B82Y 40/00* (2011.01)
(52) U.S. Cl.
    CPC ...... *C01P 2002/34* (2013.01); *C01P 2004/04* (2013.01); *C01P 2004/64* (2013.01)

(56) References Cited

FOREIGN PATENT DOCUMENTS

| | | |
|---|---|---|
| CN | 105602560 A | 5/2016 |
| CN | 105838366 A | 8/2016 |
| CN | 107946485 A | 4/2018 |
| CN | 108002430 A | 5/2018 |
| WO | 2016088019 A1 | 6/2016 |

\* cited by examiner

```
┌─────────────────────────────────────────────────────────────┐
│  Providing a first solution including caesium oleate, a second solution  │──── S101
│    including lead halide and a third solution including DDAB             │
└─────────────────────────────────────────────────────────────┘
                               │
┌─────────────────────────────────────────────────────────────┐
│ Adding the first solution, the second solution and the third solution into │
│ a non-polar alkyl solution at a preset proportion and stirring to obtain a │──── S102
│                     perovskite quantum dot solution                        │
└─────────────────────────────────────────────────────────────┘
```

FIG. 1

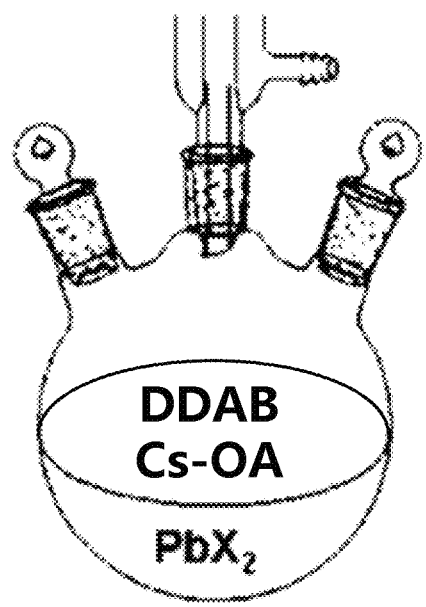

FIG. 2

PEROVSKITE QUANTUM DOT PREPARATION METHOD AND PEROVSKITE QUANTUM DOT SOLUTION

CROSS-REFERENCE TO RELATED APPLICATIONS

The present application is a continuation-application of International (PCT) Patent Application No. PCT/CN2018/096195, filed on Jul. 19, 2018, which claims foreign priority of Chinese Patent Application No. 201810457127.4, filed on May 14, 2018 in the State Intellectual Property Office of China, the entire contents of which are hereby incorporated by reference.

FIELD OF THE INVENTION

This disclosure relates to the technical field of light emitting materials, and more particularly, relates to a perovskite quantum dot preparation method and a perovskite quantum dot solution.

BACKGROUND OF THE INVENTION

Perovskite materials have found wide application in research regarding solar energy batteries, lasers, light emitting diodes (LEDs), flat panel displays or the like due to excellent electrical properties thereof such as a fast electron mobility rate, a large exciton bonding energy, a long diffusion distance or the like as well as optical properties thereof such as a very high fluorescence quantum efficiency or the like. A substance of pure phase that has synthesized particles of uniform shape and size and small dispersity is the basis of the research. Caesium-lead-halogen (e.g., $Cs_4PbX_6$) is a material of importance in perovskite. Methods for synthesizing caesium-lead-halogen ($Cs_4PbX_6$) currently available generally include a high temperature fusion method, a mechanical polishing method or the like. Particles synthesized by these synthetic methods have large sizes and are a mixture of $Cs_4PbX_6$, $CsPb_2X_5$, $CsPbX_3$ or the like, so the sizes of the synthesized particles are not uniform and the particles are not pure and cannot be used for further research. Moreover, the synthetic methods are relatively complicated with many conditions and have complex blocks, so the methods cannot satisfy requirements of industrial production.

SUMMARY OF THE INVENTION

A main technical problem to be solved by this disclosure is to provide a perovskite quantum dot preparation method and a perovskite quantum dot solution, which can solve the problem that the method for synthesizing caesium-lead-halogen perovskite quantum dot current available is complicated and the particles synthesized by the method is not pure.

To solve the aforesaid technical problem, one technical solution adopted by this disclosure is to provide a preparation method for perovskite quantum dot, which may include: providing a first solution including caesium oleate, a second solution including lead halide and a third solution including dimethyl didodecyl ammonium bromide (DDAB); adding the first solution, the second solution and the third solution into a non-polar alkyl solution at a preset proportion and stirring to obtain a perovskite quantum dot solution. The perovskite quantum dot solution may include caesium-lead-halogen of pure phase. The preset proportion may be a molar ratio of 4:1:6 among the caesium oleate, the lead halide and the DDAB. The halogen in the caesium-lead-halogen may include at least one of chlorine element, bromine element and iodine element.

To solve the aforesaid technical problem, one technical solution adopted by this disclosure is to provide a preparation method for perovskite quantum dot, which may include: providing a first solution including caesium oleate, a second solution including lead halide and a third solution including DDAB; adding the first solution, the second solution and the third solution into a non-polar alkyl solution at a preset proportion and stirring to obtain a perovskite quantum dot solution. The perovskite quantum dot solution may include caesium-lead-halogen of pure phase.

To solve the aforesaid technical problem, another technical solution adopted by this disclosure is to provide a perovskite quantum dot solution which may include caesium-lead-halogen of pure phase; the perovskite quantum dot solution may be obtained by adding a first solution, a second solution and a third solution into a non-polar alkyl solution at a preset proportion and stirring the mixture. The first solution may include caesium oleate, the second solution may include lead halide and the third solution may include DDAB.

As compared to the prior art, this disclosure has the following benefits: in part of embodiments of this disclosure, a first solution including caesium oleate, a second solution including lead halide and a third solution including DDAB may be added into a non-polar alkyl solution at a preset proportion and the mixture is stifled so that the solvent reacts sufficiently, and the preset proportion allows nanometer particles of caesium-lead-halogen perovskite in the perovskite quantum dot solution obtained finally to be unitary and have an uniform size, which facilitates the subsequent in-depth research. Moreover, the preparation method has simple blocks and can be conducted under normal temperature and pressure without limitation on the environmental condition, and thus the preparation method satisfies requirements of industrial production.

BRIEF DESCRIPTION OF THE DRAWINGS

FIG. 1 is a schematic flowchart diagram of a first embodiment of a preparation method for perovskite quantum dot according to this disclosure.

FIG. 2 is a schematic view illustrating a three-necked flask being used as a synthetic device in the first embodiment of the preparation method for perovskite quantum dot according to this disclosure.

DETAILED DESCRIPTION OF THE INVENTION

Figure 3:
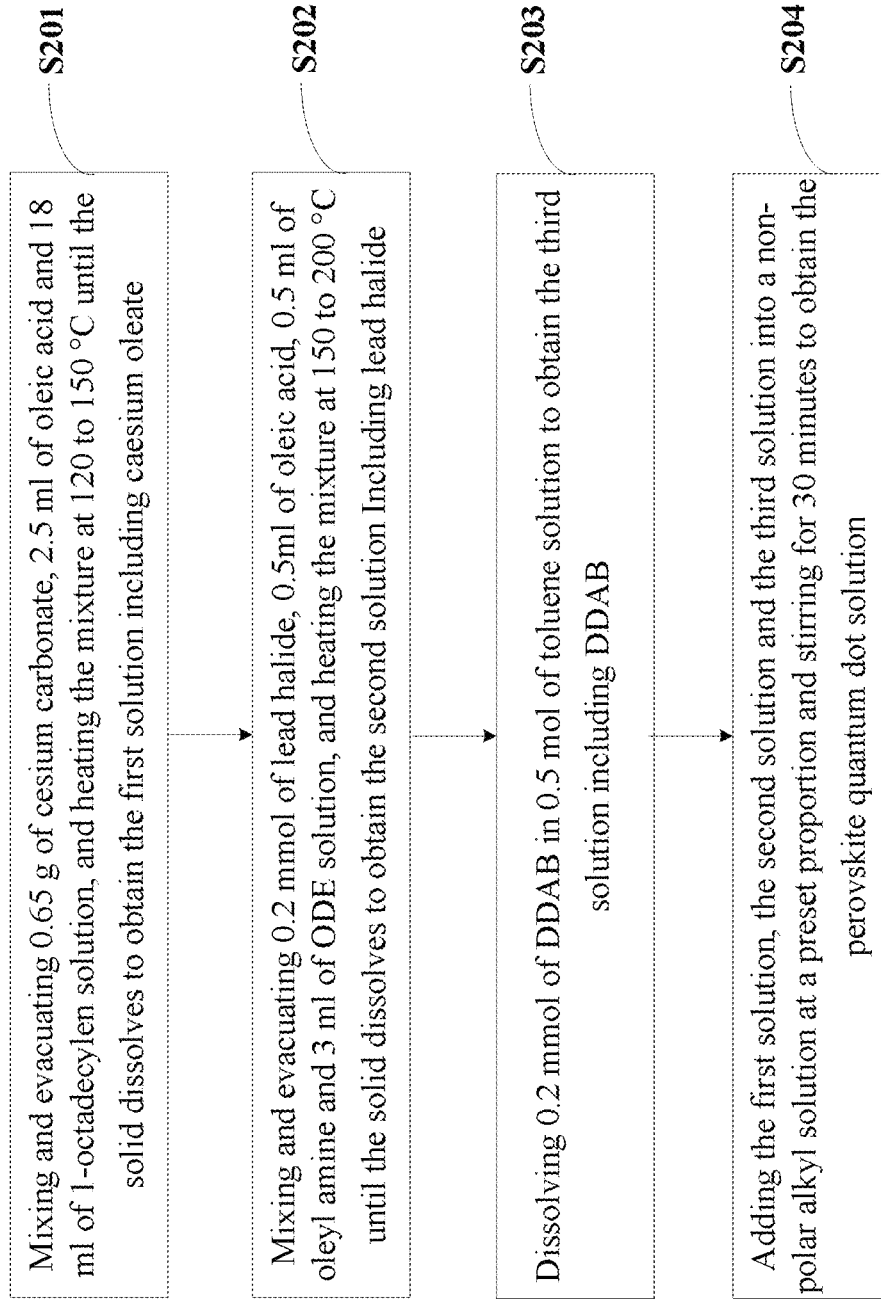
FIG. 3 is a schematic flowchart diagram of a second embodiment of the preparation method for perovskite quantum dot according to this disclosure.

Technical solutions of embodiments of this disclosure will be described clearly and completely with reference to the attached drawings illustrating the embodiments of this disclosure. Obviously, the embodiments described herein are only a part of but not all of the embodiments of this disclosure. All other embodiments that can be obtained by those of ordinary skill in the art from the embodiments of this disclosure without making creative efforts shall fall within the scope of this disclosure.

As shown in FIG. 1, a first embodiment of a preparation method for perovskite quantum dot according to this disclosure may include:

S101: providing a first solution including caesium oleate, a second solution including lead halide and a third solution including dimethyl didodecyl ammonium bromide (DDAB);

wherein the halogen X in the lead halide may be at least one of chlorine element (Cl), bromine element (Br) and iodine element (I), and the third solution may be a toluene solution including DDAB.

The proportion among the caesium oleate (Cs-OA) included in the first solution, the lead halide ($PbCl_2$, $PbBr_2$ or $PbI_2$) included in the second solution and the DDAB included in the third solution may be determined depending on actual needs, and no specific limitation is made thereto.

S102: adding the first solution, the second solution and the third solution into a non-polar alkyl solution at a preset proportion and stirring to obtain a perovskite quantum dot solution.

The perovskite quantum dot solution may include caesium-lead-halogen of pure phase. A substance of pure phase may be a substance having a single physical or chemical property and a very high phase concentration. The caesium-lead-halogen may be $Cs_4PbX_6$, $CsPbX_3$ or $CsPb_2X_5$ or the like, and may be selected depending on actual needs, and no specific limitation is made thereto. The halogen X may be at least one of chlorine element (Cl), bromine element (Br) and iodine element (I). $Cs_4PbX_6$ is taken as an example for illustration in this disclosure.

The preset proportion may be obtained by analyzing elements in the specific substance of caesium-lead-halogen that needs to be prepared. The preset proportion may be specifically a volume ratio of the solution, a molar ratio of the solutes or a mass ratio of the solutes or the like.

The non-polar alkyl may include at least one of the normal hexane, dodecane, octadecane and squalane. Of course, the non-polar alkyl solution may also include other types of non-polar alkyl, and no specific limitation is made thereto.

Specifically, in an disclosure example, the first solution, the second solution and the third solution may be simultaneously added into a synthetic device containing the non-polar alkyl solution (e.g., normal hexane) at a preset proportion, e.g., at a molar ratio of 4:1:6 among the Cs-OA in the first solution, the lead halide in the second solution and the DDAB in the third solution, and directly stirred for a period of time (e.g., 30 minutes) under normal temperature and pressure so that the Cs-OA, the lead halide and the DDAB react sufficiently, thereby obtaining the perovskite quantum dot solution including $Cs_4PbX_6$ of pure phase finally. The specific time for stirring may be 30 to 60 minutes, or 20 to 30 minutes. The specific time for stirring may be specifically set depending on the proportion of the solute to the solution. No specific limitation is made thereto.

The synthetic device may be a three-necked flask (as shown in FIG. 2), and multiple reactants may be simultaneously added into the three-necked flask, and a stirring rod may be used in combination with the three-necked flask. Narrow openings of the three-necked flask may prevent the spill of the solution or reduce the evaporation of the solution, and may be used in combination with rubber plugs and/or connected with other glass equipments.

Specifically, in an disclosure example, during the preparation of the perovskite quantum dot solution, first a certain amount (e.g., 10 ml) of non-polar alkyl solution may be added into a three-necked flask in advance, then the first solution, the second solution and the third solution are poured into the three-necked flask through three openings respectively, next rubber plugs are inserted into the openings, and then the flask is shaken for stirring. Alternatively, one of the rubber plugs may be equipped with a stirring device (e.g., a stirring rod or the like), and the stirring device goes deep into the flask to stir the liquid contained in the flask, and finally the desired perovskite quantum dot solution can be obtained.

Of course, the synthetic device may also be a beaker or other devices in which the liquid can be contained and stirred, and no specific limitation is made thereto.

In this embodiment, the first solution including caesium oleate, the second solution including lead halide and the third solution including DDAB may be added into the non-polar alkyl solution at a preset proportion and stirred so that the solvent reacts sufficiently. The preset proportion allows nanometer particles of caesium-lead-halogen perovskite in the perovskite quantum dot solution obtained finally to be unitary and have an uniform size, which may facilitate the subsequent in-depth research. Moreover, the preparation method has simple blocks and can be conducted under normal temperature and pressure without limitation on the environmental condition, and thus the preparation method satisfies requirements of industrial production.

As shown in FIG. 3, a second embodiment of the preparation method for perovskite quantum dot according to this disclosure may include:

S201: mixing and evacuating 0.65 g of cesium carbonate, 2.5 ml of oleic acid and 18 ml of 1-octadecylen solution, and heating the mixture at 120 to 150° C. until the solid dissolves to obtain the first solution including caesium oleate.

Cesium carbonate ($Cs_2CO_3$) may be a kind of inorganic compound and a white solid under normal temperature and pressure, which is highly soluble in water and can quickly absorb moisture when placed in the air. $Cs_2CO_3$ aqueous solution may be strongly alkaline and can react with acids to generate corresponding caesium salts, water and $CO_2$. Oleic acid (OA) may be a kind of monounsaturated Omega-9 fatty acid that exists in animals and plants. The 1-octadecylen (ODE) solution may be a colorless liquid that is often used for organic synthesis.

S202: mixing and evacuating 0.2 mmol of lead halide, 0.5 ml of oleic acid, 0.5 ml of oleyl amine and 3 ml of ODE solution, and heating the mixture at 150 to 200° C. until the solid dissolves to obtain the second solution including lead halide.

The halogen X in the lead halide ($PbX_2$) may be Cl, Br or I. The oleyl amine (OLA) may also be called 9-octadecylenamine, which may be a C18 unsaturated amine and be a colorless to light yellow liquid or crystal. The 9-octadecylenamine may have a pungent smell and be corrosive.

S203: dissolving 0.2 mmol of DDAB in 0.5 mol of toluene solution to obtain the third solution including DDAB.

DDAB may also be called as di-n-dodecyl and may be used as a cationic surfactant.

S204: adding the first solution, the second solution and the third solution into a non-polar alkyl solution at a preset proportion and stirring for 30 minutes to obtain the perovskite quantum dot solution.

Specifically, the caesium oleate in the first solution, the lead halide in the second solution and the DDAB in the third solution may be added into a non-polar alkyl solution (e.g., dodecyl solution) at a molar ratio of 4:1:6, and stirred for 30 minutes to obtain the perovskite quantum dot solution including $Cs_4PbX_6$ of pure phase. The molar ratio of the solutes in the first solution, the second solution and the third solution may be obtained by analyzing elements in the caesium-lead-halogen of pure phase that needs to be obtained finally.

Of course, in other embodiments, the preset proportion may also be a volume ratio of the solution, which may specifically be determined according to elements in the caesium-lead-halogen of pure phase that needs to be obtained finally as well as the proportion of the solutes in the first solution, the second solution and the third solution, and no specific limitation is made thereto.

Figure 4:
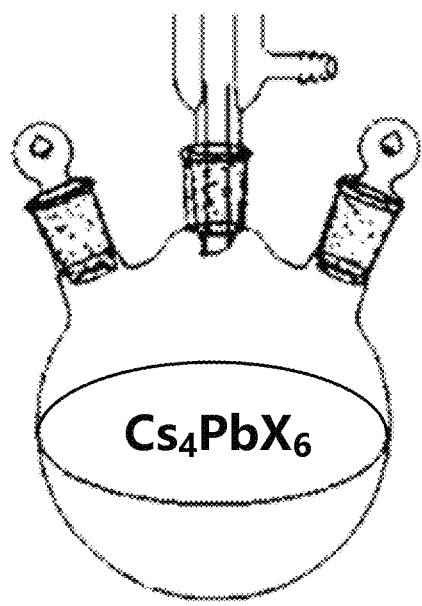
FIG. 4 is a schematic structural view of an embodiment of a perovskite quantum dot solution according to this disclosure.

As shown in FIG. 4, in an embodiment of the perovskite quantum dot according to this disclosure, the perovskite quantum dot may include caesium-lead-halogen of pure phase.

The caesium-lead-halogen may be $Cs_4PbX_6$, $CsPbX_3$ or $CsPb_2X_5$ or the like. The perovskite quantum dot may be prepared by the first or the second embodiment of the preparation method for perovskite quantum dot according to this disclosure.

Specifically, after obtaining the perovskite quantum dot solution using the preparation method for perovskite quantum dot according to this disclosure, a part of the perovskite quantum dot solution may be taken as a sample, and the sample may be observed using devices such as a microscope or the like, thereby determining whether the state or property of the substance obtained satisfies requirements of the quantum dot of pure phase. Of course, in other embodiments, the perovskite quantum dot solution obtained using the preparation method for perovskite quantum dot according to this disclosure may also be processed to obtain solids such as perovskite quantum dot powders or particles or the like, and then a part of the solids may be taken as a sample to be observed using devices such as a microscope or the like.

For example, a transmission electron microscope (TEM) may be utilized to observe micro structures or ultramicro structures that are smaller than 0.2 μm and cannot be clearly observed under an optical microscope.

Figure 5:
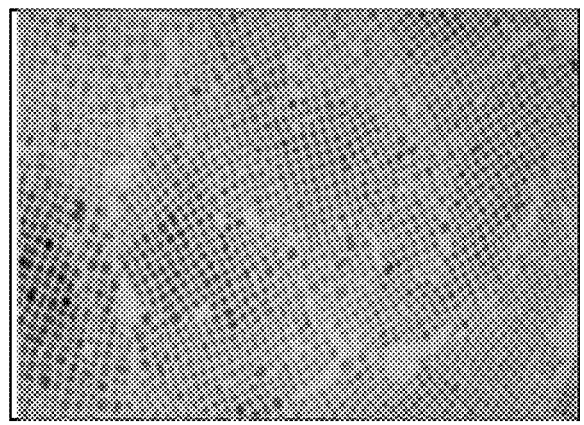
FIG. 5 is a TEM spectrogram of synthesized particles in the perovskite quantum dot solution according to this disclosure.

Referring to FIG. 5, as can be seen from the TEM spectrogram of perovskite quantum dot prepared using the preparation method for perovskite quantum dot according to this disclosure, the synthesized particles (e.g., nanometer particles of $Cs_4PbX_6$ perovskite) may be unitary and uniform in size and have relatively good quality, which facilitates subsequent in-depth research.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A preparation method for perovskite quantum dot, comprising:
   providing a first solution comprising caesium oleate, a second solution comprising lead halide and a third solution comprising dimethyl didodecyl ammonium bromide (DDAB); and
   adding the first solution, the second solution and the third solution into a non-polar alkyl solution at a preset proportion and stirring to obtain a perovskite quantum dot solution;
   wherein the perovskite quantum dot solution comprises caesium-lead-halogen; the preset proportion is a molar ratio of 4:1:6 among the caesium oleate, the lead halide and the DDAB; and the halogen in the caesium-lead-halogen comprises at least one of chlorine element, bromine element and iodine element,
   wherein the caesium-lead-halogen is $Cs_4PbX_6$, and X is the halogen.

2. The preparation method of claim 1, wherein the non-polar alkyl solution comprises at least one non-polar alkyl selected from the group consisting of normal hexane, dodecane, octadecane and squalane.

3. A preparation method for perovskite quantum dot, comprising:
   providing a first solution comprising caesium oleate, a second solution comprising lead halide and a third solution comprising DDAB; and
   adding the first solution, the second solution and the third solution into a non-polar alkyl solution at a preset proportion and stirring to obtain a perovskite quantum dot solution;
   wherein the perovskite quantum dot solution comprises caesium-lead-halogen,
   wherein the caesium-lead-halogen is $Cs_4PbX_6$, and X is the halogen.

4. The preparation method of claim 3, wherein the providing the first solution comprising caesium oleate further comprises:
   mixing and evacuating 0.65 g of cesium carbonate, 2.5 ml of oleic acid and 18 ml of 1-octadecylen solution to obtain a mixture, and heating the mixture at 120 to 150° C. until the solid dissolves to obtain the first solution.

5. The preparation method of claim 3, wherein the providing the second solution comprising lead halide further comprises:
   mixing and evacuating 0.2 mmol of lead halide, 0.5 ml of oleic acid, 0.5 ml of oleyl amine and 3 ml of 1-octadecylen solution to obtain a mixture, and heating the mixture at 150 to 200° C. until the solid dissolves to obtain the second solution.

6. The preparation method of claim 3, wherein the providing the third solution comprising DDAB further comprises:
   dissolving 0.2 mmol of DDAB in 0.5 mol of toluene solution to obtain the third solution.

7. The preparation method of claim 3, wherein the adding the first solution, the second solution and the third solution into a non-polar alkyl solution at a preset proportion and stirring to obtain a perovskite quantum dot solution comprises:
   adding the first solution, the second solution and the third solution into a non-polar alkyl solution at a preset proportion and stirring for 30 minutes to obtain the perovskite quantum dot solution.

8. The preparation method of claim 3, wherein the preset proportion is a molar ratio of 4:1:6 among the caesium oleate, the lead halide and the DDAB.

9. The preparation method of claim 7, wherein the non-polar alkyl solution comprises at least one non-polar alkyl selected from the group consisting of normal hexane, dodecane, octadecane and squalane.

10. The preparation method of claim 3, wherein adding the first solution, the second solution and the third solution into a non-polar alkyl solution at a preset proportion and stirring to obtain a perovskite quantum dot solution comprises:

adding the first solution, the second solution and the third solution into a three-necked flask containing the non-polar alkyl solution at a preset proportion and stirring to obtain the perovskite quantum dot solution.

11. The preparation method of claim 3, wherein the halogen in the caesium-lead-halogen comprises at least one of chlorine element, bromine element and iodine element.

* * * * *